(12) United States Patent
Rao et al.

(10) Patent No.: US 12,711,767 B2
(45) Date of Patent: Aug. 18, 2026

(54) SYSTEM AND METHOD FOR IDENTIFYING EVENTS IN A VIDEO STREAM

(71) Applicant: Honeywell International Inc., Charlotte, NC (US)

(72) Inventors: Manjuprakash Rama Rao, Bengaluru (IN); Sayantan Das, Bengaluru (IN); Sambasivarao Karlakunta, Bengaluru (IN); Shrihari Eknath Gunjal, Maharashtra (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 383 days.

(21) Appl. No.: 18/478,604

(22) Filed: Sep. 29, 2023

(65) Prior Publication Data

US 2025/0111673 A1 Apr. 3, 2025

(51) Int. Cl.
*G06V 20/40* (2022.01)
*G06V 10/774* (2022.01)

(52) U.S. Cl.
CPC ............ *G06V 20/44* (2022.01); *G06V 10/774* (2022.01); *G06V 20/41* (2022.01)

(58) Field of Classification Search
CPC ...... G06V 20/44; G06V 10/774; G06V 20/41; G06V 10/7792; G06V 10/98; G06V 10/82; G06V 20/52; G06V 10/87; G06V 10/764; G06V 10/776
See application file for complete search history.

(56) References Cited

U.S. PATENT DOCUMENTS

| | | | | |
|---|---|---|---|---|
| 10,796,202 B2 | 10/2020 | Gurghian et al. | | |
| 2009/0244390 A1* | 10/2009 | Feris | ...................... | G06V 20/41 348/701 |
| 2014/0211988 A1* | 7/2014 | Fan | ........................ | G06V 20/52 382/103 |
| 2020/0151360 A1* | 5/2020 | Zavesky | ............ | G06F 21/6218 |

FOREIGN PATENT DOCUMENTS

| | | |
|---|---|---|
| CN | 101310288 B | 7/2011 |
| CN | 113537145 A | 10/2021 |
| KR | 2021114169 A | 9/2021 |

OTHER PUBLICATIONS

Pham, Nam Trung, et al. "Two-stage unattended object detection method with proposals." 2017 IEEE 2nd International Conference on Signal and Image Processing (ICSIP). IEEE, 2017. (Year: 2017).*

(Continued)

*Primary Examiner* — Amandeep Saini
*Assistant Examiner* — Denise G Alfonso
(74) *Attorney, Agent, or Firm* — Seager, Tufte & Wickhem, LLP

(57) ABSTRACT

Events may be identified in a video stream using a first video analytics algorithm and the identified events may be validated using a second video analytics algorithm that is more comprehensive than the first video analytics algorithm. The event as identified by the first video analytics algorithm may be reported when the identified event is validated by the second video analytics algorithm.

12 Claims, 5 Drawing Sheets

(56) References Cited

OTHER PUBLICATIONS

Zhou, Xu-Gang, and Li-Qing Zhang. "Abnormal event detection using recurrent neural network." 2015 International conference on computer science and applications (CSA). IEEE, 2015. (Year: 2015).*

Chen, Guo, et al. "Videollm: Modeling video sequence with large language models." arXiv preprint arXiv:2305.13292 (2023). (Year: 2023).*

Bhusal et al., "SoK: Modeling Explainablity in Security Monitoring for Trust, Privacy, and Interpretability," 16 pages, Oct. 31, 2022.

Dosovitskiy et al., "An Image is Worth 16X16 Words: Transformers for Image Recognition at Scale," Published as a Conference Paper, ICLR 2021, 22 pages.

Wikipedia, Vision Transformers, 5 pages, Accessed May 23, 2023.

Elena Luna et al., "Abandoned Object Detection in Video-Surveillance: Survey and Comparison," Sensors, vol. 18, No. 12, Dec. 5, 2018 (32 pages).

Park Minji et al., "Two-Step Real-Time Night-Time Fire Detection in an Urban Environment Using Static ELASTIC-YOLOv3 and Temporal Fire-Tube," Sensors, vol. 20, No. 8, Apr. 13, 202, pp. 1-17.

Choi Jongwon et al., "Patch-based fire detection with online outlier learning," 2015 IEEE International Conference on Advanced Video and Signal Based Surveillance (AVSS), IEEE, Aug. 25, 2015 (Aug. 25, 2015), pp. 1-6.

Pham Nam Trung et al., "Two-stage unattended object detection method with proposals", 2017 IEEE 2nd International Conference on Signal and Image Processing (ICSIP), IEEE, Aug. 4, 2017 (Aug. 4, 2017), pp. 1-4.

Extended European Search Report, EP Application No. 24198818.7, European Patent Office, Feb. 6, 2025 (10 pages).

* cited by examiner

SYSTEM AND METHOD FOR IDENTIFYING EVENTS IN A VIDEO STREAM

TECHNICAL FIELD

The present disclosure relates to methods and systems for performing event recognition in a video stream and more particularly to methods and systems for improving accuracy in performing event recognition in a video stream.

BACKGROUND

A number of video processing algorithms are known and used. Some video processing algorithms are simpler and require relatively less computational power to run while other video processing algorithms are more comprehensive and require relatively more computational power to run. In addition to tradeoffs between speed and computational requirements, there can be tradeoffs in accuracy. Simpler algorithms, which may require less computational power, may be less accurate while more comprehensive algorithms, which require more computational power, may be more accurate. What would be desirable are methods and systems for balancing the benefits and costs of various video processing algorithms in detecting events in a video stream.

SUMMARY

The present disclosure relates to methods and systems for performing event recognition in a video stream and more particularly to methods and systems for improving accuracy in performing event recognition in a video stream. An example may be found in a method for identifying events in a video stream. The illustrative method includes processing the video stream using a first video analytics algorithm (e.g. a simpler less computationally intensive video analytics algorithm) to identify a candidate event in the video stream and a candidate event type of the candidate event. One or more images are extracted from the video stream that represent the candidate event. The one or more images extracted from the video stream that represent the candidate event are processed using a second video analytics algorithm (e.g. a more comprehensive and more computationally intensive video analytics algorithm) to identify a ground truth for the candidate event. A determination is made as to whether the ground truth for the candidate event matches the candidate event having the candidate event type as determined by the first video analytics algorithm. The candidate event having the candidate event type is reported to a monitoring station when the ground truth for the candidate event matches the candidate event having the candidate event type as determined by the first video analytics algorithm. The candidate event having the candidate event type is not reported to the monitoring station when the ground truth for the candidate event does not match the candidate event having the candidate event type as determined by the first video analytics algorithm. In some cases, when the ground truth for the candidate event does not match the candidate event having the candidate event type as determined by the first video analytics algorithm, the first video analytics model may be trained using the ground truth for the candidate event as determined by the second video analytics algorithm.

Another example may be found in a system. The illustrative system includes one or more memories for storing a first video analytics algorithm and a second video analytics algorithm, wherein the second video analytics algorithm is a more computationally intensive than the first video analytics algorithm. The illustrative system includes one or more controllers operatively coupled to the one or more memories. The one or more are controllers are configured to receive a video stream and to process the video stream using the first video analytics algorithm to identify a candidate event in the video stream and a candidate event type of the candidate event. The one or more controllers are configured to extract one or more images from the video stream that represent the candidate event and to process the one or more images extracted from the video stream that represent the candidate event using the second video analytics algorithm to identify a ground truth for the candidate event. The one or more controllers are configured to determine whether the ground truth for the candidate event matches the candidate event having the candidate event type as determined by the first video analytics algorithm. The one or more controllers are configured to report the candidate event having the candidate event type when the ground truth for the candidate event matches the candidate event having the candidate event type as determined by the first video analytics algorithm and to not report the candidate event having the candidate event type when the ground truth for the candidate event does not match the candidate event having the candidate event type as determined by the first video analytics algorithm.

Another example may be found in a method for identifying events in a video stream. The method includes identifying an event in a video stream using a first video analytics algorithm and validating the identified event in the video stream using a second video analytics algorithm, wherein the second video analytics algorithm is more comprehensive than the first video analytics algorithm. The method includes reporting the event as identified by the first video analytics algorithm when the identified event is validated by the second video analytics algorithm and not reporting the event as identified by the first video analytics algorithm when the identified event is not validated by the second video analytics algorithm.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1A:
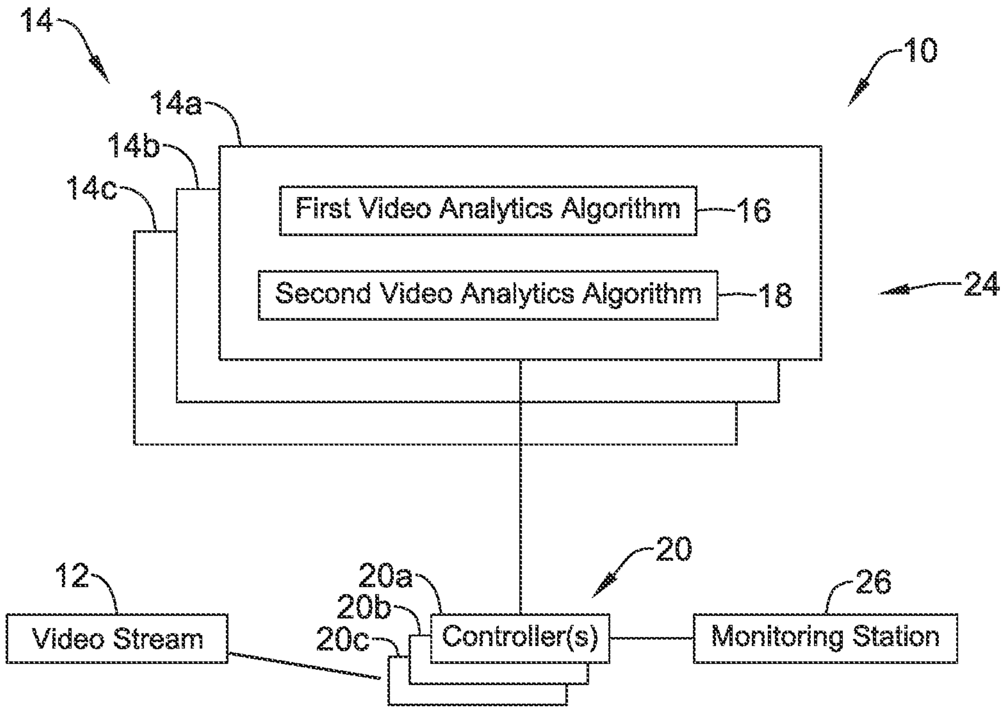
FIG. 1A is a schematic block diagram showing an illustrative system for identifying events in a video stream.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1A is a schematic block diagram showing an illustrative system 10 for identifying events in a video stream 12. While a single video stream 12 is shown, it will be appreciated that the system 10 may receive multiple video streams from each of a number of video cameras or a video storage device, for example. The illustrative system 10 includes one or more memories generally shown at 14, including for example a memory 14*a*, a memory 14*b* and a memory 14*c*. While three memories 14 are shown, this is merely illustrative. The one or more memories 14 are collectively configured to store a first video analytics algorithm 16 and a second video analytics algorithm 18. One or more controllers 20, labeled controller 20*a*, 20*b* and 20*c*, may be operatively coupled to the one or more memories 14. A monitoring station 26 may be operatively coupled to one or more of the controllers 20. The monitoring station 26 may be configured to allow a user to view images from the video stream 12, for example, as well as to view possible event alerts raised by the one or more controllers 20. In some instances, the system 10 may reside within a single computing device, for example. While in other instances, the system 10 may be distributed across multiple computing device.

Figure 1B:
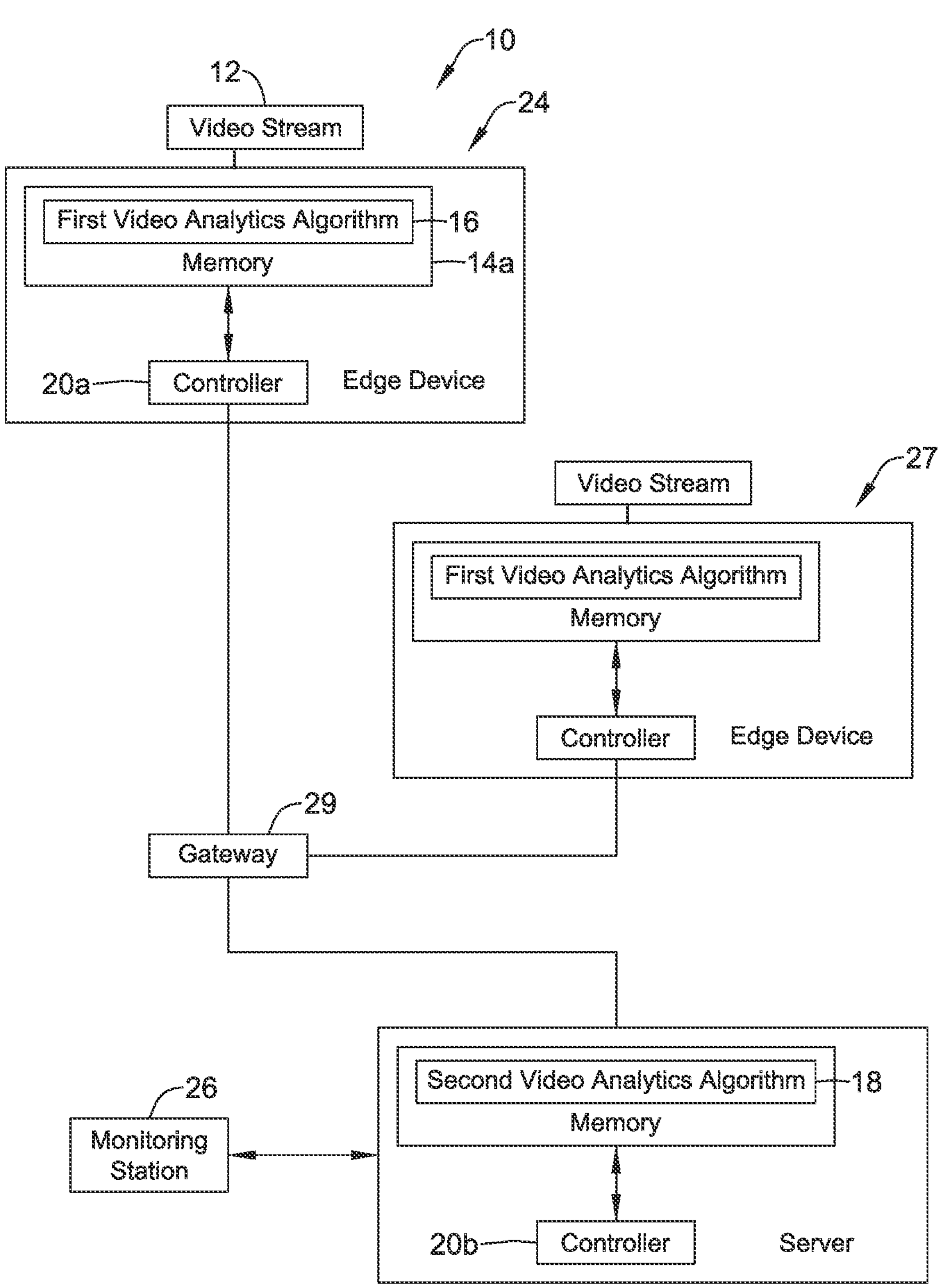
FIG. 1B is a schematic block diagram showing the illustrative system of FIG. 1A distributed across multiple computing devices.

FIG. 1B is a schematic block diagram showing the illustrative system 10 distributed across multiple computing devices. In the example shown in FIG. 1B, the illustrative system 10 is distributed across an edge device 24 and a server 22 (e.g. a cloud server or other server, including an on-premises server). A gateway 29 provides a communication path between the edge device 24 and the server 22. In some cases, the server 22 may service one or more other edge devices, such as edge device 27 via the gateway 29. The edge devices 24 and 27 may have a reduced computational capacity relative to the server 22.

In FIG. 1B, the memory 14*a* and the controller 20*a* of FIG. 1A are disposed within the edge device 24, and the memory 14*b* and the controller 20*b* are disposed within the server 22 (e.g. a cloud server). When so provided, the edge device 24 stores and executes the first video analytics algorithm 16, and the server 22 stores and executes the second video analytics algorithm 18. In some instances, the edge device 24 may execute the first video analytics algorithm 16 on the video stream 12 to determine a candidate event and candidate event type. The edge device 24 may extract one or more images from the video stream 12 that represent the candidate event. The one or more images may include a single image, two or more images, and/or a video clip. The one or more images extracted from the video stream 12 may be sent to the server 22 via the gateway 29. The server 22 may execute the second video analytics algorithm 18 on the one or more images extracted from the video stream 12 by the edge device 24 to ascertain a ground truth, and to confirm or deny what was found by the first video analytics algorithm 16 of the edge device 24.

The server may interact with the monitoring station 26. The server may report the candidate event having the candidate event type to the monitoring station 26 when the ground truth for the candidate event matches the candidate event having the candidate event type as determined by the first video analytics algorithm 16 of the edge device 24. The candidate event having the candidate event type is not reported to the monitoring station 26 when the ground truth for the candidate event does not match the candidate event having the candidate event type as determined by the first video analytics algorithm 16 of the edge device 24. In some cases, when the ground truth for the candidate event does not match the candidate event having the candidate event type as determined by the first video analytics algorithm 16 of the edge device 24, the first video analytics algorithm 16 may be trained using the ground truth for the candidate event as determined by the second video analytics algorithm 18 of the server 22.

To give a few examples of how the ground truth provided by the second video analytics algorithm 18 can be used for event validation, a traffic cone may be identified by the first video analytics algorithm 16 as a "person loitering" while the second video analytics algorithm 18 may correctly identify the traffic cone as "a red and white traffic cone. In another example, a computer may be identified by the first video analytics algorithm 16 as a "person loitering" while the second video analytics algorithm 18 may correctly identify "a small monitor". In another example, a floor may be identified by the first video analytics algorithm 16 as an "object left" or "object abandoned" while the second video analytics m algorithm model 18 may correctly identify "a tile in a floor". In yet another example, a chair may be identified by the first video analytics algorithm 16 as an "object left" or "object abandoned" while the second video analytics algorithm 18 may correctly identify "a black office chair sitting in front of a table". These are just examples.

To give an example of conditional alarm suppression, the first video analytics algorithm 16 may raise a line crossing alarm in response to seeing people crossing a safety line that is painted adjacent to a boarding platform of a train station.

The second video analytics algorithm 18 may identify the scene as "people actively boarding a train that is parked at the train platform". Since the people need to cross the safety line adjacent the train platform to actively board the train, the line cross alarm raised by the first video analytics algorithm may be suppressed and not sent to the monitoring station. This may eliminate some false positive alarms, thereby not needlessly distracting the operator of the monitoring station. However, if the second video analytics algorithm 18 identifies the scene as "people crossing the safety line while a train is approaching the train platform", the line cross alarm raised by the first video analytics algorithm may not be suppressed and may be forwarded to the monitoring station.

To give a few examples of anti-spoofing, the first video analytics algorithm 16 may raise a fire alarm in response to detecting a fire within a scene. The second video analytics algorithm 18 may correctly identify that the scene includes a painting on the wall that includes a fire scene, or perhaps a large screen television showing a show in which a fire is burning. As a result, the fire alarm generated by the first video analytics algorithm 16 will be suppressed because the system determines that there is no actual fire occurring. As another example, a person is not authorized to gain access through a particular door may attempt to spoof an access control camera by holding up a badge that includes a photo of a face of a person who is authorized. Even though the first video analytics algorithm 16 may detect and identify the picture of the person as actually being the person, the second video analytics algorithm 18 may determine that it is not a live face of a person, but is rather just a picture of a person.

Figure 2:
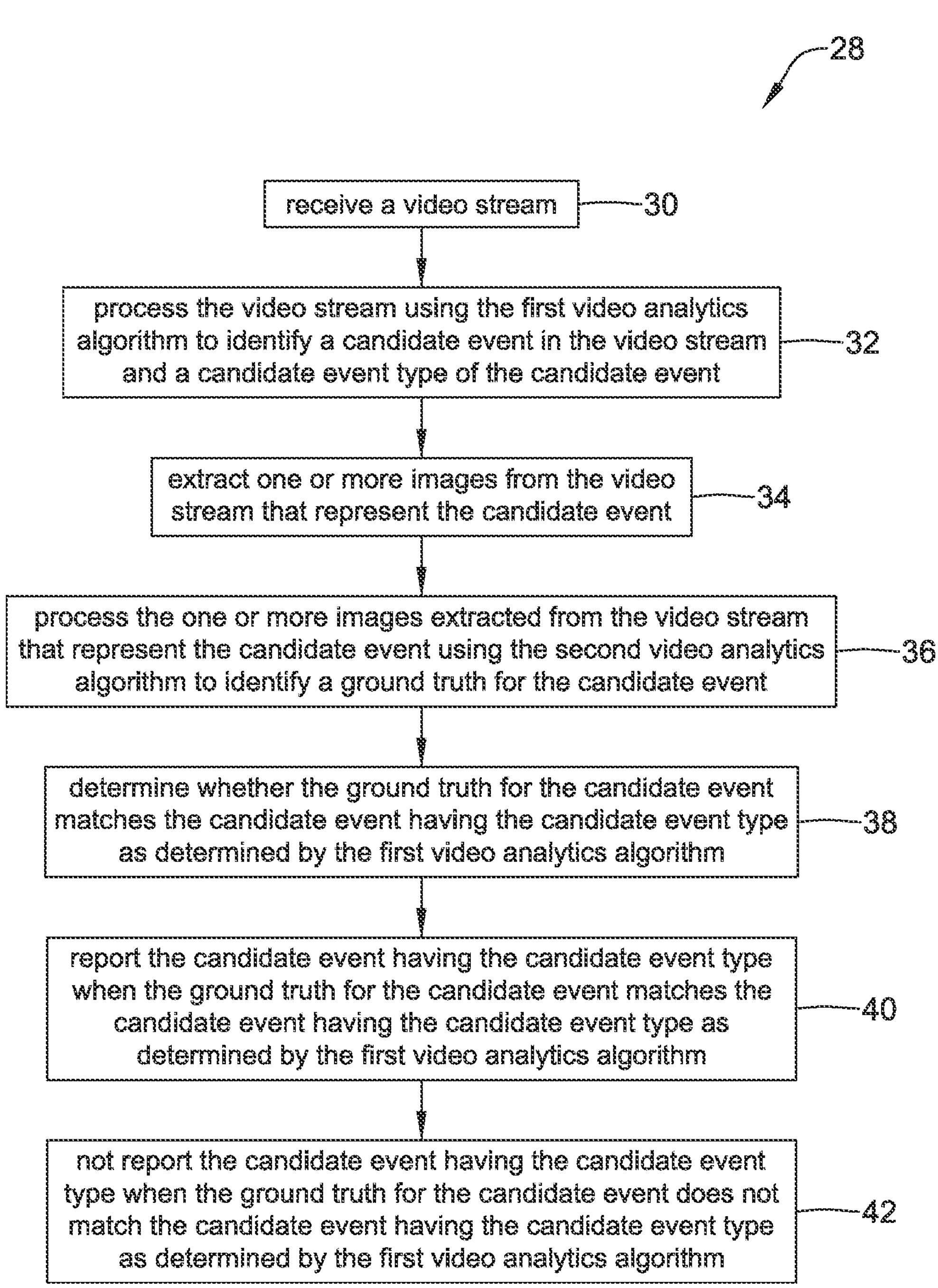
FIG. 2 is a flow diagram showing a series of steps that a controller forming part of the illustrative system of FIG. 1 may be configured to carry out.

FIG. 2 is a flow diagram showing an illustrative series of steps 28 that each of the one or more controllers 20 may be configured to carry out. Some of the series of steps 28 may be carried out by the controller 20*a* in the edge device 24. Some of the series of steps 28 may be carried out by the controller 20*b* in the server 22. One or more controllers 20 may be configured to receive the video stream 12, as indicated at block 30. One or more controllers 20 may be configured to process the video stream 12 using the first video analytics algorithm 16 to identify a candidate event in the video stream 12 and a candidate event type of the candidate event, as indicated at block 32. One or more controllers 20 may be configured to extract one or more images from the video stream that represent the candidate event, as indicated at block 34. One or more controllers 20 may be configured to process the one or more images extracted from the video stream 12 that represent the candidate event using the second video analytics algorithm 18 to identify a ground truth for the candidate event, as indicated at block 36.

One or more controllers 20 may be configured to determine whether the ground truth for the candidate event matches the candidate event having the candidate event type as determined by the first video analytics algorithm 16, as indicated at block 38. One or more controllers 20 may be configured to report the candidate event having the candidate event type when the ground truth for the candidate event matches the candidate event having the candidate event type as determined by the first video analytics algorithm 16, as indicated at block 40. One or more controllers 20 may be configured to not report the candidate event having the candidate event type when the ground truth for the candidate event does not match the candidate event having the candidate event type as determined by the first video analytics algorithm 16. In some instances, one or more controllers 20 may be configured to report the ground truth for the candidate event when the ground truth for the candidate event does not match the candidate event having the candidate event type.

In some instances, an edge device, such as edge device 24, may be configured to initially process the video stream 12 using the first video analytics algorithm 16 to identify the candidate event in the video stream and the candidate event type of the candidate event, and a server, such as server 22, may be configured to process the one or more images extracted from the video stream 12 that represent the candidate event using the second video analytics algorithm 18 to identify the ground truth for the candidate event. In some instances, the first video analytics algorithm 16 may be trained using the one or more images extracted from the video stream 12 that represent the candidate event and the corresponding ground truth for the candidate event.

Figure 3:
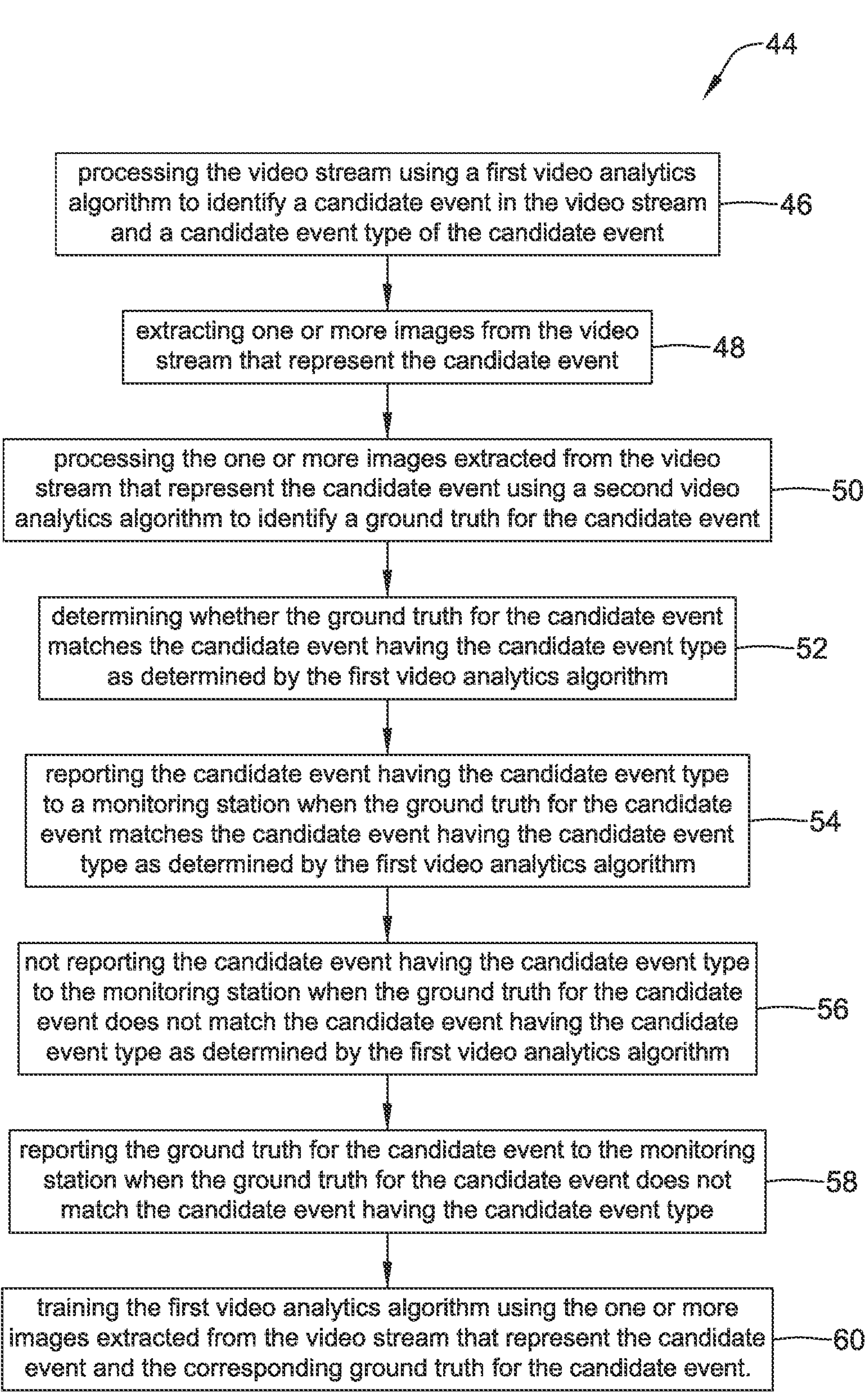
FIG. 3 is a flow diagram showing an illustrative method for identifying events in a video stream.

FIG. 3 is a flow diagram showing an illustrative method 44 for identifying events in a video stream (such as the video stream 12). The illustrative method 44 includes processing the video stream using a first video analytics model (such as the first video analytics model 16) to identify a candidate event in the video stream and a candidate event type of the candidate event, as indicated at block 46. In some instances, the first video analytics algorithm may include one or more object detection algorithms, object tracking algorithms, or object classifications algorithms. As an example, the one or more object detection and/or object tracking algorithms may include one or more of an object detection algorithm, an intrusion detection algorithm, a loitering detection algorithm, an abandoned object detection algorithm and an object tracking algorithm. In some instances, the first video analytics algorithm may identify the candidate event in the video stream and the candidate event type based at least in part on an output from one or more of the one or more object detection and/or tracking algorithms of the first video analytics algorithm.

One or more images are extracted from the video stream that represent the candidate event, as indicated at block 48. In some instances, the one or more images from the video stream that represent the candidate event may include a cropped image from a video frame of the video stream that represent the candidate event. In some instances, the one or more images from the video stream that represent the candidate event may include a video clip. The one or more images extracted from the video stream that represent the candidate event are processed using a second video analytics algorithm (such as the second video analytics algorithm 18) to identify a ground truth for the candidate event, as indicated at block 50. In some instances, the second video analytics algorithm may be a more comprehensive video analytics algorithm than the first video analytics algorithm. In some instances, the second video analytics algorithm may be more computationally intensive than the first video analytics algorithm. In some instances, the first video analytics algorithm may be executed by an edge device (such as the edge device 24) while the second video analytics algorithm may be executed by a server (such as the server 22). For example, the edge device 24 may process the video stream using the first video analytics algorithm to identify the candidate event in the video stream and the candidate event type of the candidate event, and the server 22 may process the one or more images extracted from the video stream that represent the candidate event using the second video analytics model to identify the ground truth for the candidate event.

A determination is made as to whether the ground truth for the candidate event matches the candidate event having the candidate event type as determined by the first video analytics algorithm, as indicated at block 52. In some instances, the server 22 may determine whether the ground truth for the candidate event matches the candidate event having the candidate event type. The candidate event having the candidate event type is reported to a monitoring station (such as the monitoring station 26) when the ground truth for the candidate event matches the candidate event having the candidate event type as determined by the first video analytics algorithm, as indicated at block 54. The candidate event having the candidate event type is not reported to the monitoring station when the ground truth for the candidate event does not match the candidate event having the candidate event type as determined by the first video analytics algorithm, as indicated at block 56.

In some instances, the method 44 may include reporting the ground truth for the candidate event to the monitoring station when the ground truth for the candidate event does not match the candidate event having the candidate event type, as indicated at block 58. In some instances, the method 44 may include training the first video analytics algorithm using the one or more images extracted from the video stream that represent the candidate event and the corresponding ground truth for the candidate event, as indicated at block 60.

In some instances, the second video analytics algorithm may include a Visual Transformer Large Language Model (ViTLLM) that outputs a textual description as the ground truth for the candidate event. In some instances, the first video analytics algorithm outputs a text description of the candidate event and the candidate event type of the candidate event, and determining whether the ground truth for the candidate event matches the candidate event having the candidate event type as determined by the first video analytics algorithm may include comparing the text description of the candidate event and the candidate event type of the candidate event output by the first video analytics algorithm with the textual description that corresponds to the ground truth for the candidate event output by the ViTLLM model. In some instances, comparing the text description of the candidate event and the candidate event type of the candidate event output by the first video analytics algorithm with the textual description that corresponds to the ground truth for the candidate event output by the ViTLLM model may include detecting one or more keywords and/or keyword synonyms in the text description of the candidate event, the candidate event type and/or in the textual description that corresponds to the ground truth for the candidate event.

Figure 4:
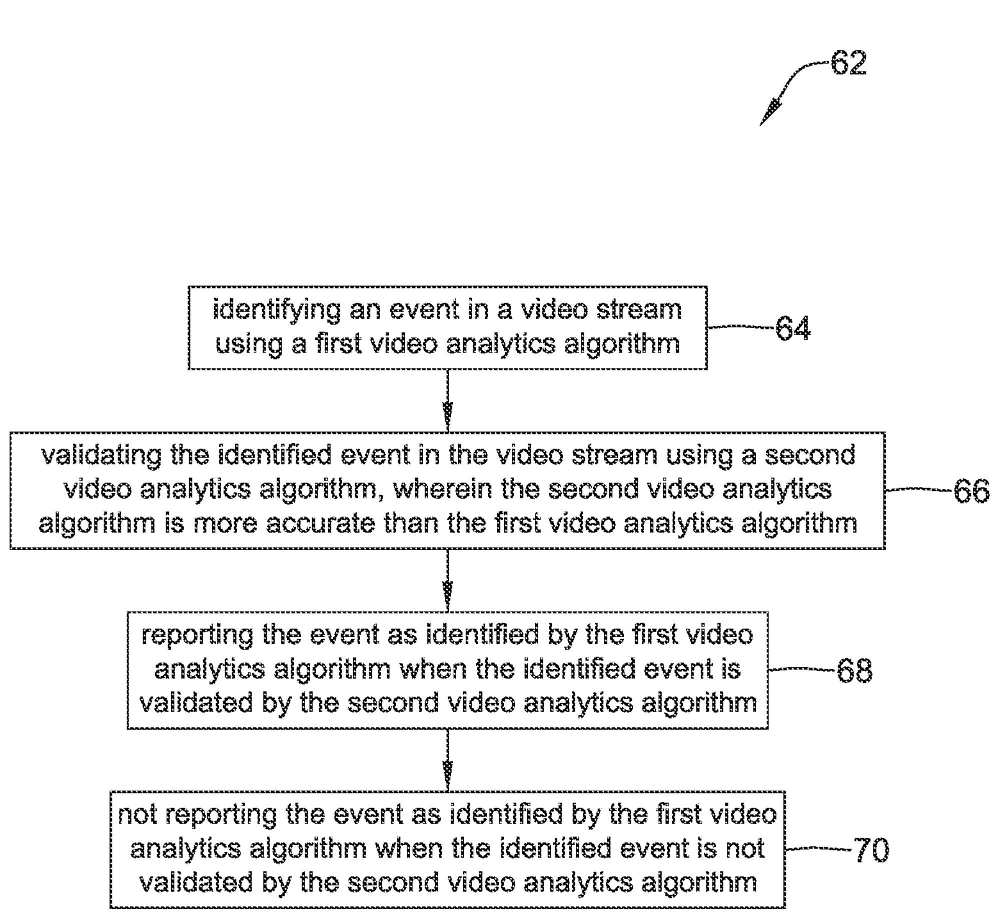
FIG. 4 is a flow diagram showing an illustrative method for identifying events in a video stream.

FIG. 4 is a flow diagram showing an illustrative method 62 for identifying events in a video stream. The method 62 includes identifying an event in a video stream using a first video analytics algorithm, as indicated at block 64. Once the event is detected by the first video analytics algorithm, the identified event is validated using a second video analytics algorithm that is more comprehensive than the first video analytics algorithm, as indicated at block 66. The event as identified by the first video analytics algorithm is reported when the identified event is validated by the second video analytics algorithm, as indicated at block 68. The event as identified by the first video analytics algorithm is not reported when the identified event is not validated by the second video analytics algorithm, as indicated at block 70.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for identifying events in a video stream, the method comprising:

processing the video stream using a first video analytics algorithm to identify a candidate event in the video stream;

extracting one or more images from the video stream that represent the candidate event;

processing the one or more images extracted from the video stream that represent the candidate event using a second video analytics algorithm which is more computationally intensive than the first video analytics algorithm to validate the candidate event identified by the first video analytics algorithm, wherein the second video analytics algorithm identifies an event in the one or more images extracted from the video stream, and includes a Visual Transformer Large Language Model (ViTLLM) that outputs a textual description of the event identified by the second video analytics algorithm;

determining whether the event identified by the second video analytics algorithm matches the candidate event as determined by the first video analytics algorithm;

reporting the candidate event to a monitoring station if the event identified by the second video analytics algorithm matches the candidate event as determined by the first video analytics algorithm; and not reporting the candidate event to the monitoring station if the event identified by the second video analytics algorithm does not match the candidate event as determined by the first video analytics algorithm.

2. The method of claim 1, wherein:

an edge device processing the video stream using the first video analytics algorithm to identify the candidate event in the video stream; and a server processing the one or more images extracted from the video stream that represent the candidate event using the second video analytics algorithm to validate the candidate event identified by the first video analytics algorithm.

3. The method of claim 1, wherein the one or more images from the video stream that represent the candidate event comprises a cropped image from a video frame of the video stream that represent the candidate event.

4. The method of claim 1, wherein the one or more images from the video stream that represent the candidate event comprises a video clip.

5. The method of claim 1, wherein the first video analytics algorithm comprises one or more object detection algorithms, object tracking algorithms, or object classification algorithms.

6. The method of claim 5, wherein the one or more object detection and/or object tracking algorithms comprise one or more of an object detection algorithm, an intrusion detection algorithm, a loitering detection algorithm, an abandoned object detection algorithm and an object tracking algorithm.

7. The method of claim 6, wherein the first video analytics algorithm identifies the candidate event in the video stream and the candidate event type based at least in part on an output from one or more of the one or more object detection and/or tracking algorithms of the first video analytics algorithm.

8. The method of claim 1, wherein the first video analytics algorithm outputs a text description of the candidate event, and wherein determining whether the event identified by the second video analytics algorithm matches the candidate event determined by the first video analytics algorithm comprises comparing the text description of the candidate event output by the first video analytics algorithm with the textual description of the event identified by the second video analytics algorithm output by the ViTLLM.

9. The method of claim 8, wherein comparing the text description of the candidate event output by the first video analytics algorithm with the textual description of the event identified by the second video analytics algorithm output by the ViTLLM model comprises detecting one or more keywords in the text description of the candidate event and/or in the textual description of the event identified by the second video analytics algorithm.

10. The method of claim 1, further comprising: if the event identified by the second video analytics algorithm does not match the candidate event determined by the first video analytics algorithm, training the first video analytics algorithm using the event identified by the second video analytics algorithm.

11. A system comprising:

one or more memories for storing a first video analytics algorithm and a second video analytics algorithm, wherein the second video analytics algorithm is more computationally intensive than the first video analytics algorithm;

one or more controllers operatively coupled to the one or more memories, the one or more controllers configured to:

receive a video stream;

process the video stream using the first video analytics algorithm to identify a candidate event in the video stream;

extract one or more images from the video stream that represent the candidate event;

process the one or more images extracted from the video stream that represent the candidate event using the second video analytics algorithm to validate the candidate event identified by the first video analytics algorithm, wherein the second video analytics algorithm identifies an event in the one or more images extracted from the video stream, and includes a Visual Transformer Large Language Model (ViTLLM) that outputs a textual description of the event identified by the second video analytics algorithm;

determine whether the event identified by the second video analytics algorithm matches the candidate event as determined by the first video analytics algorithm;

report the candidate event if the event identified by the second video analytics algorithm matches the candidate event as determined by the first video analytics algorithm; and not report the candidate event if the event identified by the second video analytics algorithm does not match the candidate event as determined by the first video analytics algorithm.

12. A method for identifying events in a video stream, the method comprising:

identifying an event in a video stream using a first video analytics algorithm;

validating the identified event in the video stream using a second video analytics algorithm, wherein the second video analytics algorithm is more comprehensive than the first video analytics algorithm, and includes a Visual Transformer Large Language Model (ViTLLM) that outputs a textual description of an event identified by the second video analytics algorithm;

reporting the event as identified by the first video analytics algorithm when the identified event is validated by the second video analytics algorithm; and not reporting the event as identified by the first video analytics algorithm when the identified event is not validated by the second video analytics algorithm.

* * * * *